United States Patent
Lu

(10) Patent No.: US 7,283,838 B2
(45) Date of Patent: Oct. 16, 2007

(54) OPEN BASEBAND PROCESSING ARCHITECTURE FOR NEXT GENERATION WIRELESS AND MOBILE COMMUNICATION TERMINAL DESIGN

(76) Inventor: Wei Lu, 1218 Bubb Rd., Cupertino, CA (US) 95014

( * ) Notice: Subject to any disclaimer, the term of this patent is extended or adjusted under 35 U.S.C. 154(b) by 269 days.

(21) Appl. No.: 10/907,951

(22) Filed: Apr. 22, 2005

(65) Prior Publication Data
US 2005/0159123 A1    Jul. 21, 2005

(51) Int. Cl.
*H04M 1/00* (2006.01)
(52) U.S. Cl. ............ 455/550.1; 455/418; 455/419; 370/469; 370/474; 709/224
(58) Field of Classification Search ........ 455/550.1, 455/418, 419; 370/469, 474; 709/324; 713/320
See application file for complete search history.

(56) References Cited

U.S. PATENT DOCUMENTS

| | | | |
|---|---|---|---|
| 6,963,586 B2 * | 11/2005 | Henriksson et al. | 370/469 |
| 2002/0016869 A1 * | 2/2002 | Comeau et al. | 709/324 |
| 2002/0045441 A1 * | 4/2002 | Ralston et al. | 455/418 |
| 2003/0050055 A1 * | 3/2003 | Ting et al. | 455/419 |
| 2005/0076256 A1 * | 4/2005 | Fleck et al. | 713/320 |
| 2006/0010272 A1 * | 1/2006 | Solomon et al. | 710/105 |

\* cited by examiner

*Primary Examiner*—Danh Le

(57) ABSTRACT

An open baseband processing architecture for next generation wireless and mobile communication terminal system supporting full integration and convergence of existing and future wireless standards with open processing engines to optimize the terminal system performance and network resource management.

20 Claims, 3 Drawing Sheets

A Next Generation Open Mobile Network Architecture

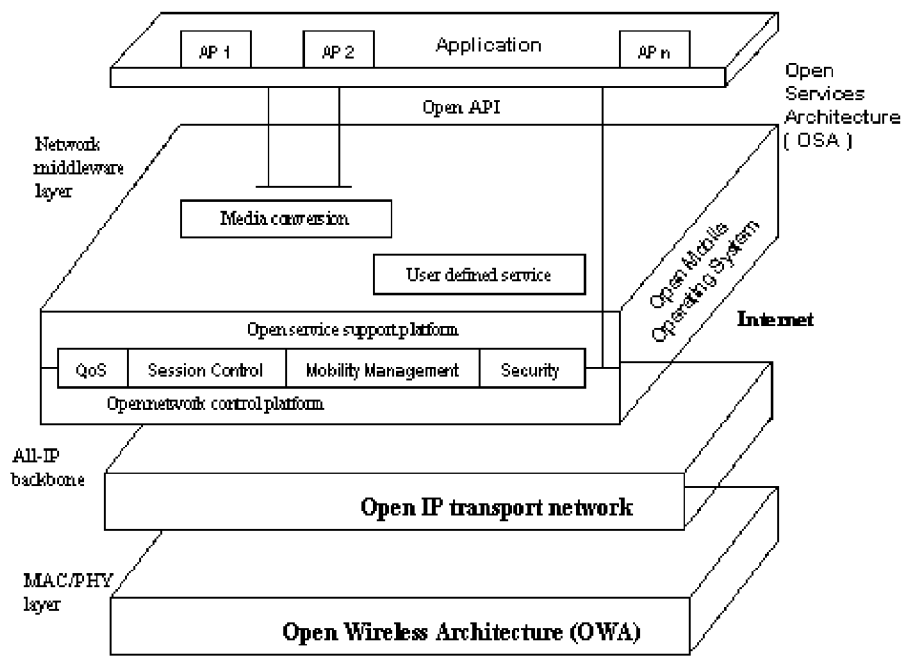
FIG.1 A Next Generation Open Mobile Network Architecture
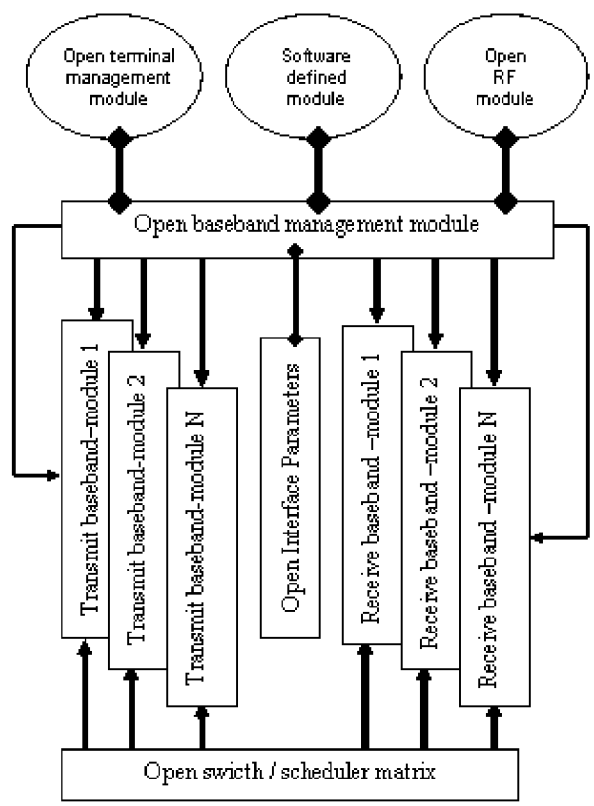
FIG.2 Open Baseband Software Architecture

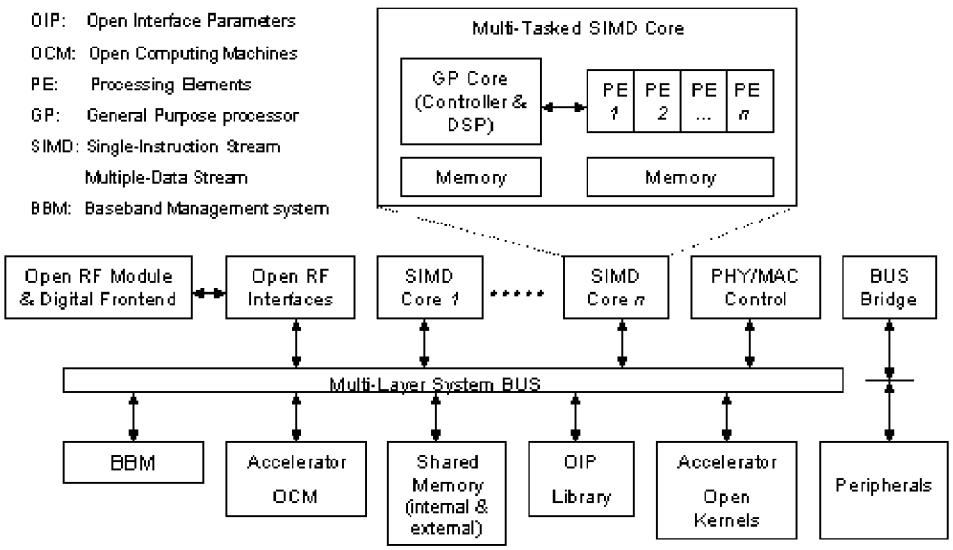
FIG.3 Open Baseband Processing Platform
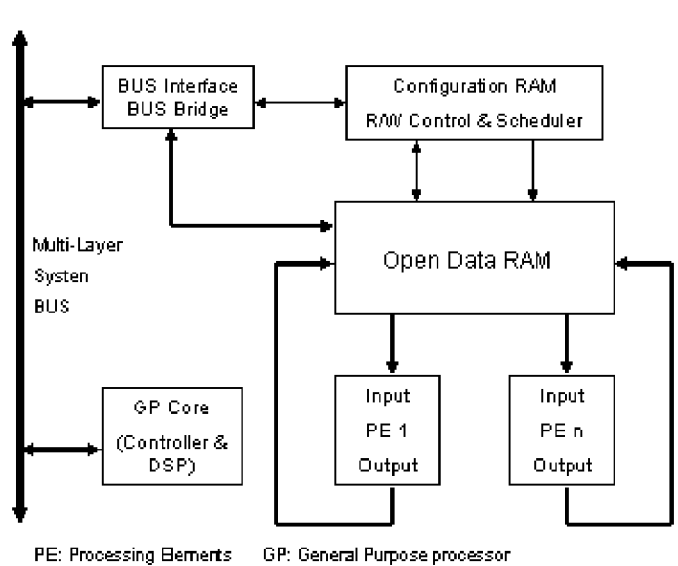
PE: Processing Elements    GP: General Purpose processor
FIG.4 Baseband Open Computing Machines (OCM) Accelerator Architecture

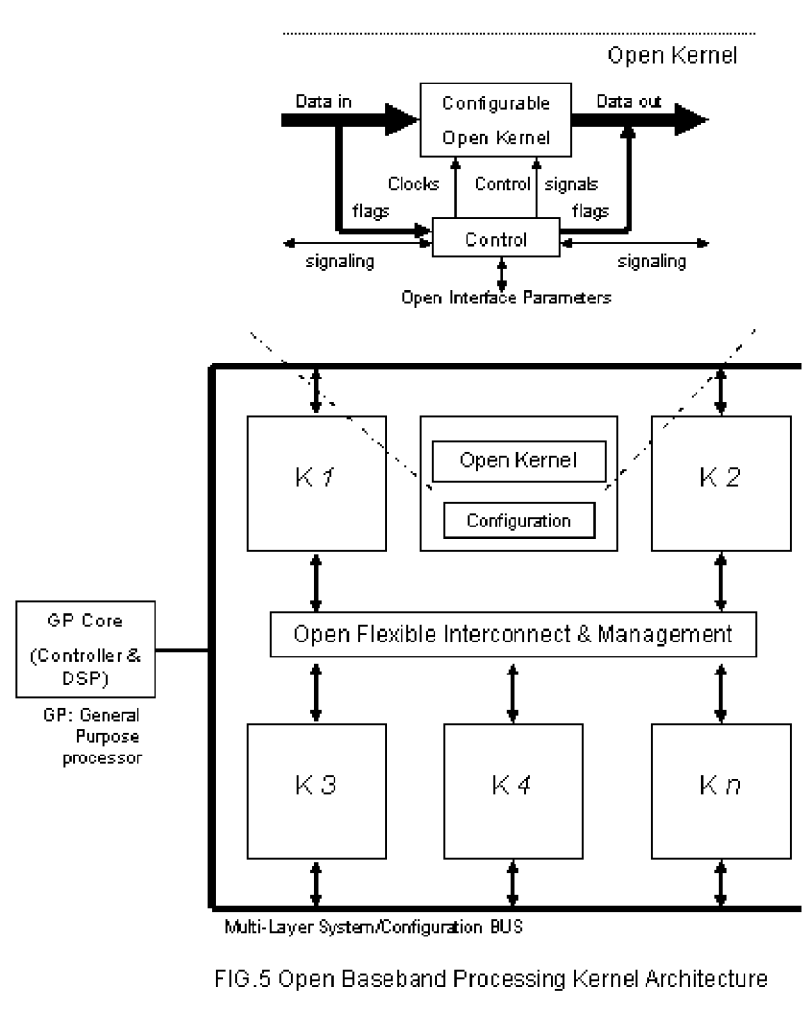
FIG.5 Open Baseband Processing Kernel Architecture

OPEN BASEBAND PROCESSING ARCHITECTURE FOR NEXT GENERATION WIRELESS AND MOBILE COMMUNICATION TERMINAL DESIGN

BACKGROUND OF THE INVENTION

1. Field of the Invention

This invention relates to an open wireless architecture terminal design, focusing on the open baseband processing platform to support different existing and future wireless communication standards through the multi-dimensional open baseband processing modules with open interface parameters and baseband management systems. The invention includes multi-layer open system architecture to maximize the system flexibility and minimize the terminal power consumption, so as to provide an integrated and converged next generation wireless and mobile communication terminal system.

2. Description of the Related Art

Second-generation (2G) mobile systems were very successful in the previous decade. Their success prompted the development of third-generation (3G) mobile systems. While 2G systems such as GSM, IS-95, and cdmaOne were designed to carry speech and low-bit-rate data, 3G systems were designed to provide higher-data-rate services. During the evolution from 2G to 3G, a range of wireless systems, including GPRS, IMT-2000, Bluetooth, WLAN, and HiperLAN, have been developed. All these systems were designed independently, targeting different service types, data rates, and users. As these systems all have their own merits and shortcomings, there is no single system that is good enough to replace all the other technologies. Instead of putting efforts into developing new radio interfaces and technologies for 4G (fourth generation) systems, which some researchers are doing, we believe establishing 4G systems that integrate existing and newly developed wireless systems into one open platform is a more feasible option.

Researchers, from all over the world, are currently developing frameworks for future 4G mobile networks. Different research programs, such as Mobile VCE, MIRAI, and DoCoMo, have their own visions on 4G features and implementations. Some key features (mainly from the users' point of view) of 4G mobile networks are stated as follows:

High usability: anytime, anywhere, and with any technology
Support for multimedia services at low transmission cost
Personalization
Integrated services Next generation wireless and mobile networks (meaning 4G mobile networks and beyond) are all-IP based heterogeneous networks that allow users to use any system at any time and anywhere. Users carrying an integrated open terminal can use a wide range of applications provided by multiple wireless networks, and access to various air interface standards. Second, next generation mobile systems provide not only telecommunications services, but also data and multimedia services. To support multimedia services, high-data-rate services with good system reliability will be provided. At the same time, a low per-bit transmission cost will be maintained. Third, personalized service will be provided by this new-generation network. It is expected that in future, users in widely different locations, occupations, and economic classes will use the services. In order to meet the demands of these diverse users, service providers should design personal and customized services for them. Finally, next generation mobile systems also provide facilities for integrated services. Users can use multiple services from any service provider at the same time based on the open services architecture.

This vision from the user perspective can be implemented by integration of these different evolving and emerging wireless access technologies in a common flexible and expandable platform to provide a multiplicity of possibilities for current and future services and applications to users in a single terminal. Systems of future mobile networks will mainly be characterized by a horizontal communication model, where different access technologies as cellular, cordless, WLAN type systems, short range wireless connectivity, broadband wireless access systems and wired systems will be combined on a common platform to complement each other in an optimum way for different service requirements and radio environments which is technically called "Open Wireless Architecture (OWA)".

In order to use the large variety of services and wireless networks in next generation wireless and mobile systems, open user terminals are essential as they can adapt to different wireless networks by reconfiguring themselves. This eliminates the need to use multiple terminals (or multiple hardware components in a terminal). The most promising and optimal way of implementing such multimode and multi-standard user terminals is to adopt the aforementioned open wireless architecture (OWA) approach.

OWA defines the open interfaces in wireless networks and systems, including baseband signal processing system, RF system, networking, and service and application, so that the system can support different wireless industrial standards and integrate the various wireless networks into an open broadband platform. For comparison, Software Defined Radio (SDR) is only a radio in which the operating parameters including interalia frequency range, modulation type, and/or output power limitations, etc can be set or altered by software. Therefore, SDR is just coupling different wireless systems into a reconfigurable radio without defining an open interface within the converged wireless platform. SDR consumes much more power when the number of supported wireless standards increase, especially in the RF system and baseband processing systems.

Like open computer architecture in the computer system, the aforementioned OWA shares all the open system resources including hardware and software by mapping different wireless standards to the open interface parameters of baseband, RF and networks. Each OWA system module is an open module, rather than any standard-specific module, and can be easily reconfigured to maximize the system performance, and minimize the power consumption.

To migrate current systems to such an advanced open wireless system with the features mentioned above, we have to face a number of technical challenges in the open baseband processing:

Terminal design is much hard than base station design due to its limitation of power consumption, chip area, and processing capability, Open architecture requires full flexibility in baseband processing which normally can be handled by general-purpose processors and digital signal processors. However, these processors consume more power with less efficiency in system performance.

Application-specific integrated circuits (ASIC) is a very efficient processor and consumes low power compared to genera-purpose processors and DSPs, but without flexibility in supporting different wireless standards, because ASIC is normally a standard-specific implementation solution.

Open Wireless Architecture demands efficient baseband processing management system to optimize the open processing modules and system performance.

Such an open baseband processing architecture of the terminal design as provided by the present invention provides an optimal solution to manage the baseband processing tasks for the next generation mobile communication terminals integrating and converging different wireless standards based on the open wireless architecture.

SUMMARY OF THE INVENTION

This invention is directed to an open baseband processing architecture for next generation wireless and mobile communication terminal design which provides an optimal open baseband processing platform supporting different existing and future defined wireless radio transmission technologies (or air interfaces) including, but not limited to, W-CDMA (code division multiple access), cdma2000, GSM, GPRS, OFDMA (orthogonal frequency division multiple access), WLAN (wireless local area network), WPAN (wireless personal access network) and BWA (broadband wireless access system), either in the simultaneous connection mode, or in the selective connection mode of various wireless standards in the user's service geographic region, where different radio standards are mapped into the open interface parameters as inputs to the open processing modules scheduled and administrated by the Baseband Management system for the optimization of the system performance and resource of the wireless mobile terminal.

The open baseband processing architecture of the present invention incorporates a multi-dimensional open processing architecture including the general-purpose processors and digital signal processors (DSP) to handle the main flow of the baseband algorithms and protocols, and the special processing accelerators to focus on the computationally intensive repetitive operations of specific communication-oriented algorithms, such as, but not limited to, space-time transceiver processing, adaptive modulation, channel coding and equalization. The processing accelerators of the present invention are very important open processing subsystems in the mobile terminal design because they utilize the distributed open modular flexible architecture to achieve the ASIC-like efficiency and performance. The processing accelerators of the present invention include two different open accelerators: OCM (Open Computing Machines) Accelerator and Open-Kernels Accelerator. The OCM Accelerator of the present invention is a very efficient and powerful processing engine for complex repetitive communication-oriented algorithms, including, but not limited to, adaptive modulation and space-time processing. The Open-Kernels Accelerator of the present invention handles independent or dependent communication protocol cores, algorithm cores, and service and application processing cores, including, but not limited to, open service architecture processing and service convergence processing. The multi-dimensional open processing architecture of the present invention also includes the multi-tasked SIMD (single-instruction stream, multiple-data stream) processing cores to deal with the small scale wireless convergence and integration solution, for example, but not limited to, W-CDMA/GSM/WLAN 3-in-1 integrated terminal, and CDMA/OFDM 2-in-1 integrated terminal. In this case, the aforementioned SIMD Cores can handle all the communication algorithms and protocols, and the aforementioned accelerators can be turned off in order to save terminal power and minimize the power consumption.

The open baseband processing architecture of the present invention incorporates an efficient baseband management method based on the open processing tree. The open processing tree of the present invention includes, but can be reconfigured, a) processing root utilized by the system main processor, handling general system operations and maintenances; b) processing trunk utilized by aforementioned general-purpose processors and DSPs or aforementioned SIMD cores, handling the main flow of the baseband algorithms and protocols, and controlling the accelerators; c) processing branches utilized by aforementioned OCM Accelerators and aforementioned Open Kernels Accelerators, handling the complex communication-oriented algorithms and protocols; d) processing leafs utilized by aforementioned Open Kernels Accelerators or the general-purpose processors and DSPs of the aforementioned SIMD Cores, handling general processing of Open Services Architecture (OSA). The open tree architecture of the present invention is a proven efficient tasks scheduler for open baseband processing of the future mobile terminal, where users can reconfigure the processing tree to optimize the system performance. If the aforementioned tree is small enough, for example of simple wireless convergence of 2-in-1 or 3-in-1 integrated terminal, the aforementioned SIMD cores are capable of handling all the baseband processing tasks of the system, and therefore the system power consumption can minimized.

The open baseband processing architecture of the present invention incorporates capability to support Open Services Architecture (OSA) including, but not limited to, open application program interface (OAPI), service convergence, open mobile operating systems, quality of service (QoS), session controls, mobility management, security, media conversion and user defined services. The open services architecture of the present invention is a very important open service platform supporting different services and applications (both existing and future defined) of different wireless standards by various service providers so that the same open terminal can simultaneously or selectively access to different wireless networks in the user's service geographic region.

The open baseband processing architecture of the present invention incorporates capabilities to allocate some baseband processing modules to the external processors, controllers and DSPs defined as the Software Defined Modules (SDM) containing, but not limited to, algorithms, parameters, instructions, tasks and service-related cores. The aforementioned SDM can also be the data module to be stored in the internal or external memory, or transferred to/from the Internet. The software defined module of the present invention is a very useful portable baseband module for the future mobile applications, for example, but not limited to, a mobile handset can share with a mobile car-terminal on system resources where the car-terminal can help process some modules for the mobile handset based on the open wireless architecture (OWA).

The open baseband processing architecture of the present invention guarantees that all the processing modules are open modules instead of standard-specific modules which are used by the existing mobile communications. These open modules based on Open Wireless Architecture (OWA) with Open Interface Parameters (OIP) are the shared processing engines for the different wireless standards to maximize the system processing efficiency. Meanwhile, many of the aforementioned open modules are the independent modules which can be easily turned off/on based on the system requirement and resource management to minimize the terminal power consumption. The open interface parameters of the present invention map between the various wireless standards and the open processing modules, and incorporate capabilities to define new radio transmission technology for the future wireless mobile communications.

The open baseband processing architecture of the present invention also incorporates capabilities to support the open RF (radio frequency) module through the open RF interfaces. As different wireless standards may work in different radio frequency bands, a portable radio header with aforementioned open RF interface is necessary for next generation mobile communications. The aforementioned open wireless architecture is optimized with the shared spectrum allocation strategy, and RF direct conversion method, though it works quite well with the existing RF solutions of the converged wireless terminal.

Other features of the open baseband processing architecture of the present invention comprise the physical layer transmission convergence including, but not limited to, adaptive modulation, adaptive channel coding, digital filtering, etc., and medium access controls, including, but not limited to, flexible access control, dynamic channel allocation and resource management. In addition to the above, the open baseband processing architecture of the present invention also include the multi-layer system and configuration bus, and the bus bridge which defines the I/O (input/output) bandwidth to access to/from the aforementioned bus.

All these and other introductions of the present invention will become more clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which:

FIG. 1 is a next generation open mobile network architecture, wherein open services architecture of the present invention is introduced; and FIG. 2 is an open baseband processing software architecture, wherein the main software modules of the invention are listed; and FIG. 3 is a detailed representation of the open baseband processing platform of the present invention; and FIG. 4 is a baseband open computing machines (OCM) accelerator architecture of the present invention; and FIG. 5 is an open baseband processing kernel architecture of the present invention.

Like reference numerals refer to like parts throughout the several views of the drawings.

DESCRIPTION OF THE PREFERRED EMBODIMENT

The present invention relates to an open baseband processing architecture for next generation wireless and mobile communication terminal design wherein the baseband architecture is based on the Open Wireless Architecture (OWA).

The aforementioned OWA will be driven by human-oriented communication services in the future. In addition, efforts to develop various new services are being made in five categories: the Internet, location information, information distribution, remote sensing/control, and settlement. The next generation wireless communications will be based on the aforementioned OWA platform by constructing and operating a system that integrates broadband mobile networks, fixed wireless access networks, wireless LAN, and so forth.

The key to providing future mobile services is not limited to the concept of each and every subscriber having his or her own terminal to communicate. Another key issue is to build a ubiquitous information environment surrounding humans at home, in the office, or at hot spots so that information can be obtained in various forms according to individual needs.

In the future networking, the key will be to provide an IP network with sufficient reliability, and construct a flexible open network configuration that enables seamless connections with the use of various accessing methods, the number of which will increase further in the future. FIG. 1 shows a next-generation open mobile network architecture of the present invention. "IP over everything" is believed to make progress, in which IP packets are processed based on various transport technologies. In the next-generation IP network, the control and packet forwarding functions will evolve independent of each other, and the functional configuration of the IP transport network and middleware will be separated logically. The middleware will consist of two platforms in the present invention: Open network control platform (ONCP) and Open service support platform (OSSP). The aforementioned ONCP and OSSP functions include open mobility management, session management, QoS management, authentication and admission, security, and open transmission resource management required for wireless and mobile communications operations. The aforementioned OWA is a revolutionary new architecture for open mobility management that does not depend on one radio system, so services can be sustained seamlessly across different types of access systems. The aforementioned OSSP also consists of open service function groups exemplified by content conversion/distribution, service convergence, user defined service, etc. The OSSP functions include the provision of services unique to wireless mobile communications, such as location services support and converged common air interfaces.

The application layer, the aforementioned OSSP and part of ONCP construct the Open Services Architecture (OSA) of the present invention which will drive the future applications for next generation mobile networks. The aforementioned OSA includes open mobile operating systems, bandwidth-on-demand and service convergence as well. The aforementioned OSA is a very important open service platform supporting different services and applications of different wireless standards by various service providers so that the same open terminal can simultaneously or selectively access to different wireless networks in the user's service geographic region.

As for future open terminals of the present invention, limited-functionality chiptype terminals (so small that they can not provide any services by themselves) are expected to emerge and form a ubiquitous environment, in addition to the generic all-in-one mobile terminals serving as the evolved version of existing terminals. Furthermore, connections between future open terminals are expected to be based primarily on local networks, such as ad hoc networks. In this manner, an extremely broad range of access and networking capabilities will be supported in the aforementioned OWA systems of the present invention.

Open wireless architecture, as set forth above, helps expand the future service areas and implement services flexibly at low cost, just by changing the open radio interface parameters using the radio frequency, frequency bandwidth, radio frame composition, and so on as the common air interfaces, based on the open baseband processing platform of the present invention.

Increasing user demands for flexibility, scalability, configurability, and multifunctional communication equipment has motivated the need for important open wireless architecture (OWA) user terminal systems of the present invention. It is envisaged that the aforementioned OWA as a technology will help bring together the different forms of communications through the open interfaces. The incorporation of mobile communications, broadband wireless access systems, broadcast receivers, location services, Internet, multimedia, dedicated point-to-point communications, personal computing and digital convergence would all be possible with the help of a mature and reliable OWA technology. This would eventually lead to the realization of open radio systems and networks, as set forth above, that consist of self-organizing, self-evolutionary intelligent open wireless system infrastructure and user terminals of the present invention for ubiquitous information interaction.

The aforementioned OWA baseband is open and adaptive because of its ability to reconfigure itself and adapt itself. The software architecture of this Open Base-Band (OBB) processing subsystem of the present invention, as shown in FIG. 2, is based on object-oriented methodology. Each element of the baseband transceiver module of the present invention is open and reconfigurable by instantiation of an appropriate class and/or reinitialization of sub-module(s) with new attributes.

The OBB software architecture of the present invention consists of the following key components:

Open baseband software management module—The overall authority of the OBB processing subsystem as set forth above. It is responsible for negotiating reconfiguration, creating active and shadow transceiver modules, and controlling the runtime behavior of each module, as set forth above, and its element. It also controls the open RF subsystems (with shared spectrum management, for example, but not limited to) through appropriate signaling, and schedules the various software defined modules (SDM), as set forth above, for support of different wireless air-interfaces and optimization of system performance. In addition, it manages the open interface parameters (OIP), as set forth above, for mapping between wireless air interfaces and open parameters of the open terminal system of the present invention.

Transceiver baseband modules—the incumbent and target baseband transceiver modules.

Open interface parameters—baseband parameters defined in the aforementioned open wireless architecture to support various wireless air-interfaces.

Software defined modules—a portable processing and/or data module supporting different air-interfaces and performance optimization. It can be downloaded from Internet or loaded from a memory card. This module, as set forth above, can be processed by the external processors or DSPs. It also can carry its own processor or DSP. In addition, it may also contain the configuration map of the aforementioned transceiver baseband modules, which is the overall definition of the baseband processing subsystem of the present invention, and is important when a new standard is to be implemented.

Open terminal management module—A module for definition of the terminals with parameterized interfaces to the aforementioned transceiver baseband modules, and configuration of the open terminals supporting various air-interfaces.

Open switch/scheduler matrix—It controls and schedules the aforementioned transceiver baseband modules in different working modes—active, shadow or others.

To design the future open wireless terminal, as set forth above, the baseband processing architecture of the present invention should be open and flexible in supporting various common air interfaces. However, in the real system design and implementation, terminal power saving and power consumption become the most crucial issue in the aforementioned OWA system. Meanwhile, the silicon area is the second concern for the mobile handset design.

An open radio, as set forth above, requires the radio to have real-time reconfiguration capability to interface and communicate with open networks and open wireless air-interfaces, as set forth above, as the user moves over different geographic regions with different wireless networks, requests different services or if the radio has to adapt to varying channel conditions. Such a multimode open operation with limited resources (especially for mobile terminals) demands efficient implementation of open systems on a common hardware platform. The terminal baseband processing architecture of the present invention, which is being defined by the Open Wireless Architecture, as set forth above, is based on an open systems platform that facilitates efficient common modular processing of systems and algorithms within the open radio through the managed Open Interface Parameters (OIP) of the present invention, as set forth above.

General-purpose processors (GPP) and Digital Signal Processors (DSP) can provide maximum flexibility in baseband processing, but they consumes too much power and not efficient for intensive repetitive algorithms processing. Application-specific integrated circuits (ASIC) provide the most efficient hardware implementation of an algorithm, but without flexibility in dealing with different wireless standards in the same hardware system.

Special processing Accelerators of the present invention are thus typically used with aforementioned GPP and DSP where the GPP/DSPs handle the main flow of the baseband algorithms and protocols, and control the aforementioned accelerators that handle computationally intensive repetitive operations of specific algorithms, such as, but not limited to, space-time transceiver processing, adaptive modulation, channel coding and equalization, etc. An optimal OWA solution, as set forth above, should be able to configure its hardware to the needs of the current system, thereby minimizing power and silicon area to achieve best performance similar to or approaching to an ASIC implementation.

FIG. 3 shows an Open Baseband Processing Platform, associated with the open baseband processing architecture of the present invention, wherein the system baseband processing tasks are handled by both Multi-Tasked SIMD (single-instruction stream, multiple-data stream) Cores and special processing Accelerators. The aforementioned SIMD cores include general-purpose controllers/processors/DSPs, and several Processing Elements (PE). These SIMD cores, as set forth above, are in stream processing architecture, and generally deal with common air-interfaces of the most popular standards. Therefore, The aforementioned SIMD cores are capable to support simple converged wireless platform, such as, but not limited to, W-CDMA/GSM/WLAN 3-in-1 converged terminal.

The OWA system, as set forth above, requires open interfaces platform in support of various air interfaces. Hence, Accelerators, as set forth above, are needed to focus on the complex algorithms processing, in addition to the aforementioned SIMD processing cores, to optimize the system performance and minimize the terminal power consumption. The OCM (Open Computing Machines) Accelerator of the present invention is a very efficient co-processing subsystem to allow designers to achieve flexibility in hardware. The aforementioned OCM accelerators have open hardware for frequently used cores, such as, but not limited to, filtering, equalization, turbo coding, or other communications-oriented algorithm cores, which result in efficient open radio designs. OCM accelerators, as set forth above, also give the system the option to selectively speedup algorithms by developing specialized cores for future wireless terminal design.

The Open Kernels Accelerators of the present invention help the system to handle special functional protocols processing, algorithms processing and application-oriented cores processing, etc. Based on the Open Interface Parameters (OIP), as set forth above, defined in the aforementioned OWA system, each open kernel of the aforementioned open kernels accelerators can run independent processing tasks, as well as be configured to handle joint baseband processing through multi-layer configuration bus of the present invention.

Baseband Management system (BBM) of the present invention is a very important system level administrator to manage the processing resources of the system, wherein the key functions include:

Manage the whole system baseband processing modules and minimize the baseband processing power consumption,
Optimize the baseband processing tree structure of the present invention, defined by the aforementioned OWA,
Schedule the processing tasks to meet the OWA requirements and open interface parameters, as set forth above,
Turn on/off the processing modules to optimize the system performance.

In some applications, the aforementioned BBM can also allocate certain processing modules to the external hardware and software subsystems, in the form of software defined modules, as set forth above, or SIM (smart integrated memory) card modules, to minimize the terminal power consumption and maximize the terminal system performance.

The Open Interface Parameters (OIP) Library of the present invention contains the mappings of the common air interfaces' standards and the baseband processing parameters defined in the aforementioned open wireless architecture (OWA). As more wireless and mobile communication standards come out, this aforementioned OIP library will be updated frequently. In addition, users can define new radio transmission technology (RTT) which generates related open interface parameters, as set forth above, to reconfigure specific baseband processing algorithms, for example, but not limited to, a new wireless system with OFDM (orthogonal frequency division multiplex) in the downlink transmission, and CDMA (code division multiple access) in the uplink transmission.

The Physical Layer and Medium Access Control (PHY/MAC) control module, associated with the open baseband processing architecture of the present invention, is responsible for the following functions:

Wireless transmission convergence controls, including, but not limited to, adaptive modulation, adaptive channel coding, equalization, space-time coding, antenna control, etc.
Transmission channels control and flexible access control
Radio resource management and dynamic channels allocation The aforementioned PHY/MAC control module works with the SIMD cores and accelerators, as set forth above, through the aforementioned multi-layer system bus.

One of the very important OWA system blocks, as set forth above, is the Open RF module which supports different RF transceivers working in different frequency bands. Shared spectrum allocation will become the mission-critical spectrum management strategy in the future wireless and mobile communications, and aforementioned OWA is the best system solution for its implementation. Open RF Interface connects the baseband systems to the aforementioned Open RF module as well as the digital frontend. As radio Direct Conversion (DC) will be evolving as one of the leading conversion solutions in next generation mobile communications, digital baseband processing becomes increasingly important for future wireless terminal design. In fact, the aforementioned OWA system can be optimized by direct conversion and/or low intermediate frequency principle with digital channel filtering, etc which provides the transceiver with openness and flexibility for the multi-standard air-interfaces. The aforementioned OWA solution fully supports the convergence of various existing and future wireless standards.

Bus Bridge defines the I/O (input/output) bandwidth for the aforementioned multi-layer system bus, and control the access to/from this bus.

System memory includes processing memory and shared memory (both internal and external).

Open Computing Machines (OCM), as set forth above, in next generation mobile handset is ideal for complex open physical layer signal processing algorithms supporting various wireless air-interfaces. The aforementioned OCM can be designed as standalone hardware or as accelerators to general-purpose processors (GPs). OCM accelerators, as set forth above, can be either programmable external accelerators or embedded into a GP or DSP.

The aforementioned OCM, based on aforementioned open wireless architecture (OWA), provides an approach in which similarities and differences between the waveform radio standards are identified and parameterized into the aforementioned Open Interface Parameters (OIP) of the present invention. Therefore, the aforementioned OWA radio uses as little standard-specific hardware as possible and maximizes parameterized open modules, as set forth above, that can implement various wireless waveforms for different standards.

The FIG. 4 shows an independent OCM accelerator, associated with the open baseband processing architecture of the present invention, that can be used by the general-purpose processor or DSP. The goal is to allow the aforementioned GP or DSP to perform complex high-speed processing on the aforementioned OCM accelerator. The OCM accelerator itself, as set forth above, may consist of one or more processing elements (PEs). Each aforementioned PE can be designed for a particular class of algorithms, such as, but not limited to, adaptive modulation algorithm, channel coding algorithm, or equalization algorithm. The system can contain one or more aforementioned PEs of a similar kind (e.g., adaptive modulation) based on the needs of the open system of the present invention. The aforementioned OCM accelerator and DSP share a common and multi-layer system bus, as set forth above, which may also interface with other RAM and I/O modules.

Depending on the algorithm of the aforementioned PE, multiple sweeps on the PE might be required. The intermediate processing results are stored in the Data RAM, also called as the shadow memory. The configuration RAM provides the Read/Write control for the aforementioned data RAM to the aforementioned PEs, as well as configuration scheduler for the aforementioned PEs. The aforementioned OCM accelerator can be used to implement subroutines or loops that can run without interruption from the main processor. Once processing is completed, the aforementioned OCM interrupts the main processor, and data is transferred through bus interface and/or bus bridge, as set forth above.

The use of memory for transfer of data between the aforementioned PEs and the processor alleviates the I/O bottleneck frequently seen in the terminal baseband design.

The aforementioned OCM accelerator provides an improved open architecture along with a QoS (quality of service)—driven open operating system for future low-power mobile multimedia systems. It demonstrates that open hardware with aforementioned PEs can be used as an optimal solution for future multi-standards handsets. A software control system based on this open model of the present invention has been utilized for mapping and dynamic reconfiguration, including, but not limited to, mapping air interfaces into open interface parameters, as set forth above, and mapping applications onto open hardware platform. The aforementioned OCM accelerator can also be designed as a stream-based architecture to allow algorithms to be efficiently paged in and out of the baseband chip which greatly simplifies the implementation of multi-module open systems of the present invention.

The aforementioned OCM accelarator is very important for open wireless architecture terminals, as set forth above. Since the speed of reconfiguration of the open wireless interfaces is critical to the aforementioned OCMs, the system itself has to minimize the reconfiguration time as well as the execution time.

Low-power implementations still remain a challenge in baseband design for mobile terminals. With aforementioned OCM technology, the system remains the competitive low power consumption to meet the power requirements of the future handsets.

The aforementioned OCM accelerators are regarded as extremely powerful processing engines which can also be rapidly reconfigured for open air-interfaces of the present invention. However, they are not ideally suited for control operations since they lack a microprocessor-like architecture with flexible event-driven operations. Since control operations can be efficiently programmed on a general-purpose processor or DSP, the aforementioned OCMs will be most beneficial as accelerators or co-processors rather than standalone general processors. A GP or DSP, as set forth above, can be responsible for downloading specific processing blocks (like an equalization, Turbo decoder, demodulation, etc, but not limited to) on to the aforementioned OCM accelerator and also allow the programmer to initiate such operations in the high-level or assembly languages used to program the DSP. Processed data can be collected by the DSP by polling the aforementioned OCM accelerator, or through interrupts. Data transfer can be accomplished through shared memory depending on the applications and air interfaces. For block processing operations, requiring many aforementioned OCM cycles an interrupt-driven setup might be more favorable while polling by a DSP might be more suitable for continuous real-time processing such as multimedia applications over the future mobile terminal, but not limited to.

High-speed open signal processing usually entails large volumes of raw and processed data that have to be moved in and out of the aforementioned OCM accelerators. An aforementioned OCM accelerator designed as a separate chip that interfaces to a aforementioned GP or DSP requires careful design of the aforementioned I/O bandwidth. Hence, bus bridge, as set forth above, together with aforementioned OCM accelerator memory, is employed to solve this problem.

The aforementioned OCM accelerator of the present invention, is evolved from traditional computing machines, so parameterized cores (with open interface parameters, as set forth above) can be built as a common denominator for different wireless standards. Furthermore, the aforementioned OCM accelerator supports more general cores. Such generalized cores will allow easier implementation of new algorithms (such as, but not limited to, new air-interface standards) without modifying the hardware chip.

An OWA terminal, as set forth above, is required to support various air-interfaces and waveforms while adapting to varying channel conditions and signal strengths. As modifications are made to the algorithms, for instance, but not limited to, the error correction codes, the modulation techniques, or space-time codes, efficient spatial as well as temporal partitioning of the algorithms on hardware is important to minimize specific cost functions such as, but not limited to, latency, chip area, and terminal power.

The aforementioned OWA handsets require extremely flexible and efficient low power hardware, as well as limitation on the hardware implementation size. While general-purpose processors and DSPs can provide reconfigurable alternatives for complex high-speed processing, the use of aforementioned OCM cores can greatly enhance the performance and reducing the power consumption by optimizing the hardware for the applications and the different air-interfaces.

The open wireless architecture (OWA) platform, as set forth above, requires open processing architecture of the present invention in the baseband design including, but not limited to, channel processing, space-time transceiver processing and protocol processing. Therefore, co-processors and kernels' architecture is critical for an efficient system design, especially for future mobile terminal.

FIG. 5 shows an open baseband processing kernel architecture, associated with the open baseband processing architecture of the present invention, wherein each processing unit is an open kernel, and connected each other through an open flexible interconnect and management unit. Based on the system processing requirement, the number of processing kernels can be determined and allocated dynamically. The aforementioned kernels are carefully managed to optimize the system performance, and minimize the processing power consumption for mobile terminal design.

Each aforementioned open kernel module includes a configurable open kernel core, and the control sub-module. Based on the aforementioned various open interface parameters defined in the aforementioned open wireless architecture, the aforementioned open kernel will initiate different processing jobs based on different clocks, parameters and signals, etc. The aforementioned open kernel can also process different communication protocols as scheduled by the general baseband management system of the terminal of the present invention.

These aforementioned open kernels connect to the general-purpose processors and DSPs through aforementioned multi-layer system and configuration bus.

The open baseband processing architecture for the next generation wireless and mobile communication terminal design of the present invention is not meant to be limited to the aforementioned prototype terminal, and the subsequent specific description utilization and explanation of certain characteristics previously recited as being characteristics of this prototype terminal are not intended to be limited to such technologies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An open baseband processing architecture for next generation wireless and mobile communication terminal design said system comprising:
   a. Multi-Tasked SIMD (single-instruction stream, multiple-data stream) Core including a general-purpose processor and digital signal processor, as well as several processing elements, to deal with common air interfaces of the most popular standards,
   b. Open Computing Machines (OCM) Accelerator handling computationally intensive repetitive operations of specific communication-oriented algorithms,
   c. Open Kernels Accelerator handling special functional protocols processing, algorithms processing, operating systems processing and application-oriented cores processing, etc,
   d. Baseband Management system (BBM) to administrate and manage the processing resources of the system,
   e. Open Interface Parameters (OIP) Library containing the mappings of the common air interfaces' standards and the baseband processing parameters,
   f. Physical Layer and Medium Access Control (PHY/MAC) Control module,
   g. Open RF (Radio Frequency) Interface and Module supporting different RF transceivers working in different frequency bands,
   h. Bus Bridge defining the I/O (Input/Output) bandwidth for the Multi-Layer System Bus, and control the access to/from the bus.

2. A system as recited in claim 1 wherein said OCM Accelerator comprising:
   a) Processing Elements (PEs) handling independent or dependent complex algorithms processing,
   b) Open Data RAM storing raw and processed data,
   c) Configuration RAM managing the "read/write" control to the said PEs, and scheduling the processing tasks of the specific communication algorithms,
   d) Bus Interface and Bus Bridge controlling the access to/from the said multi-layer system bus.

3. A system as recited in claim 1 wherein said Open Kernels Accelerator comprising:
   a) Configurable Open Kernel processing specific protocols and algorithms based on the said different Open Interface Parameters (OIP),
   b) Open Flexible Interconnect and Management subsystem managing the processing resource of the said Open Kernels.

4. A system as recited in claim 1 wherein said OIP Library is updated frequently in reflecting any new defined radio transmission technology (RTT) which generates related open interface parameters to reconfigure specific baseband processing algorithms.

5. A method as recited in claim 1 wherein said PHY/MAC Control comprising:
   a) Wireless transmission convergence controls including adaptive modulation, adaptive channel coding, equalization, space-time coding, antenna control,
   b) Transmission channels control and access control,
   c) Radio resource management and dynamic channels allocation.

6. A system as recited in claim 1 wherein said Open RF module supporting shared spectrum allocation and being optimized for RF direct conversion and low intermediate frequency.

7. A system as recited in claim 1 further comprising a configuration facility to define new air interfaces for the said open terminal and connect to other open terminal based on ad-hoc networking topology.

8. A system as recited in claim 1 further comprising a configuration facility to define separate transmission technologies for downlink and uplink paths of the said open terminal, including OFDM (orthogonal frequency division multiplex) for downlink transmission and CDMA (code division multiple access) for uplink transmission.

9. A method of the Baseband Management system utilizing the processing resources of the terminal device, said method comprising:
   a) Managing the whole system baseband processing modules and minimize the baseband processing power consumption,
   b) Optimizing the baseband processing tree structure defined by the open wireless architecture (OWA),
   c) Scheduling the processing tasks based on the open interface parameters and requirements,
   d) Turning on/off the processing modules to optimize the system performance.

10. A method as recited in claim 9 comprising turning off the said OCM Accelerators and/or said Open Kernels Accelerators if the said terminal system only working statically in the very popular wireless standard or the simply converged wireless standards in order to save system power.

11. A method as recited in claim 9 wherein said processing tree comprising:
   a) processing root utilized by the system main processor, handling general system operations and maintenances,
   b) processing trunk utilized by said general-purpose processors and DSPs or said SIMD cores, handling the main flow of the baseband algorithms and protocols, and controlling the accelerators,
   c) processing branches utilized by said OCM Accelerators and said Open Kernels Accelerators, handling the complex communication-oriented algorithms and protocols.
   d) processing leafs utilized by said Open Kernels Accelerators or said general-purpose processors and DSPs of the said SIMD Cores, handling general processing of Open Services Architecture (OSA).

12. A method as recited in claim 11 wherein said SIMD Cores capable of handling all the baseband processing tasks if the processing tree is small enough (single standard or simple converged standards).

13. A system as recited in claim 11 wherein said Open Service Architecture comprising:
   a) Open Application Program Interface (API) supporting various user-defined applications,
   b) Open Service Support Platform supporting Quality-of-Service, Session Control, Mobility Management, Security, Media Conversion and User defined services,
   c) Open Mobile Operating Systems supporting flexible services of different wireless platforms, d) Open Network Control Platform supporting "IP over everything" strategy and services convergence upon the open All-IP transport networks.

14. A method as recited in claim 13 comprising capability for the said open terminal to simultaneously or selectively access to various services of different wireless networks in the user's service geographic region.

15. A method as recited in claim 9 comprising allocating some baseband modules to be Software Defined Modules (SDM) stored in the internal system memory, external memory card or transferred to/from the Internet.

16. A system as recited in claim 15 wherein said software defined module can be processed in the external processors or DSPs, and the processed data be reloaded into the system.

17. A method as recited in claim 9 comprising capabilities of removing or adding independent open processing modules including said processing elements, said accelerators and said open kernels to meet the different system requirements of the said terminal product development.

18. An open baseband software architecture for future mobile terminal said system comprising:
   a) Open baseband software management module responsible for overall management of the terminal software subsystem,
   b) Transceiver baseband modules handling the incumbent and target baseband transceiver operations,
   c) Said Open Interface Parameters supporting various wireless air-interfaces,
   d) Said Software Defined Modules utilizing the portable processing and data modules supporting open wireless standards and optimizing system performance,
   e) Open Terminal Management module providing the definition of the different terminals with parameterized interfaces to the said transceiver baseband modules, and the configuration of the terminals supporting various air-interfaces,
   f) Open Switch/Scheduler Matrix controlling and scheduling the said transceiver baseband modeuls in different working modes (active, shadow and user-defined).

19. A system as recited in claim 18 wherein said open baseband software management module comprising utilizing:
   a) negotiating reconfiguration, creating active and shadow transceiver modules, and controlling the runtime behavior of each module and its element,
   b) controlling the said open RF module through appropriate signaling to support flexible space-time transmission technology and shared spectrum allocation,
   c) scheduling and managing the said software defined modules for support of different air-interfaces and optimization of system performance,
   d) managing the said open interface parameters for mapping between the wireless air interfaces and the open parameters of said terminal system.

20. A system as recited in claim 18 wherein said transceiver baseband modules can be dynamically allocated and configured based on the system requirements where users can increase or decrease the module number to maximize the system performance and minimize the power consumption.

* * * * *